United States Patent [19]

Mertens et al.

[11] 4,431,471
[45] Feb. 14, 1984

[54] LAMINATED PANELS

[75] Inventors: Guy Mertens, Namur; Pierre Laroche, Ham-sur-Heure, both of Belgium

[73] Assignee: Glaverbel, Brussels, Belgium

[21] Appl. No.: 370,522

[22] Filed: Apr. 21, 1982

[30] Foreign Application Priority Data

Apr. 24, 1981 [GB] United Kingdom ............... 8112722

[51] Int. Cl.³ ..................... B32B 17/00; B32B 31/00
[52] U.S. Cl. .................................. 156/103; 156/104; 156/105; 156/286; 156/382
[58] Field of Search ............. 156/285, 286, 382, 103, 156/104, 105; 428/214

[56] References Cited

U.S. PATENT DOCUMENTS 3,266,371 8/1966 Gunderson ........................ 156/286
3,405,019 10/1968 Seil et al. ............................ 156/382
3,582,455 6/1971 De Lap et al. ..................... 428/214
3,769,133 10/1973 Halberschmidt et al. .......... 156/382
4,180,426 12/1979 Oustin et al. ...................... 156/286

Primary Examiner—David A. Simmons
Assistant Examiner—Timothy W. Heitbrink
Attorney, Agent, or Firm—Spencer & Frank

[57] ABSTRACT

A method of bonding a first, vitreous sheet to a second sheet to form a laminate which includes the steps of bonding together the sheets using an adhesive material which is at most 250 μm thick and has a viscosity in the range 15 to 300 poises, the adhesive being such that it is settable by evaporation of solvent or by hot or cold curing. The assembly is degassed by subjecting it to sub-atmospheric pressure at a temperature such as to maintain the adhesive viscosity within that range whereafter it is exposed to atmospheric pressure and the adhesive is caused or allowed to set.

18 Claims, 3 Drawing Figures

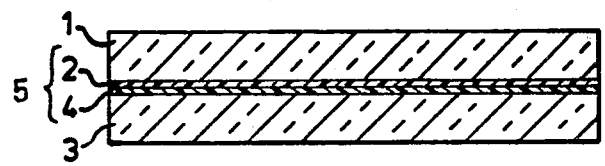
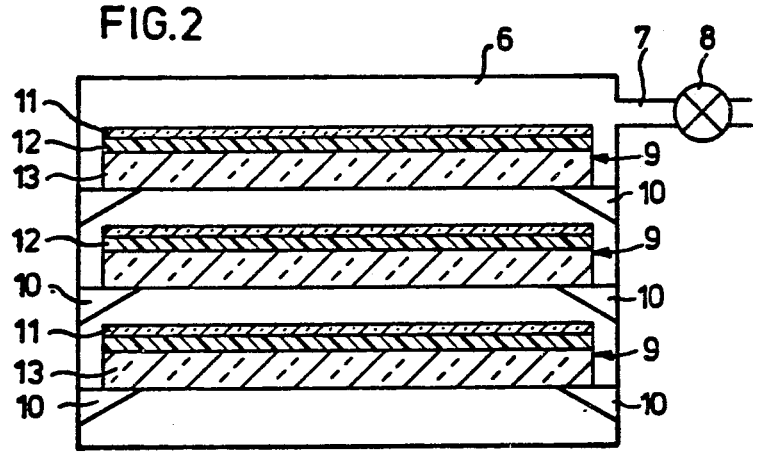

LAMINATED PANELS

BACKGROUND OF THE INVENTION

The present invention relates to a method of bonding a first, vitreous sheet to a second sheet via an intervening body of adhesive material.

In the most widely used techniques for bonding a vitreous sheet to another sheet, for example another vitreous sheet, the two sheets are assembled on either side of a film of plastic material and the assembly is degassed and subjected to firm bonding conditions. The most widely used plastic film is probably polyvinyl butyral which is readily available in sheets 0.38 mm thick. One or more such sheets may be used to provide the adhesive interlayer as desired. Other materials which are used in film form are polyvinyl chloride and polyurethane.

Whilst such bonded laminates are perfectly satisfactory for many purposes, problems have been encountered in certain particular situations where a high bonding efficiency is required. The problem arises because, over the course of time and despite the degassing step to which the assembly was subjected prior to bonding, gas bubbles can appear within the thickness of the plastics film used. Delamination can also occur. This is particularly the case where the laminate is exposed to direct solar radiation for prolonged periods.

SUMMARY OF THE INVENTION

It is an object of the present invention to alleviate the aforementioned problem and provide improved bonding process whereby bonding will remain intact even after prolonged periods of exposure to solar radiation.

According to the present invention, there is provided a method of bonding a first, vitreous sheet to a second sheet via an intervening body of adhesive material, characterized in that an assembly is made of said two sheets with a said intervening body of adhesive material which is at most 250 μm thick and has a viscosity in the range 15 to 300 poises, the adhesive being such that it is settable by evaporation of solvent or by hot or cold curing, degassing the assembly by subjecting it to subatmospheric pressure at a temperature such as to maintain the adhesive viscosity within said range and then exposing the assembly to atmospheric pressure and causing or allowing the adhesive to set.

By adopting the present invention, the appearance of bubbles within the adhesive layer can be postponed and possibly prevented. The use of an adhesive body 250 μm or less in thickness, and applying it in fluid form facilitates degassing. The viscosity range is chosen on the one hand to simplify uniform application and on the other to ensure that the adhesive itself does not flow out from between the sheets during degassing.

Particular advantages afforded by the present invention are that it is much easier to avoid the entrapment of air within the panel during bonding, that a wide range of adhesive materials can be used, and that handling of the panel parts (including the adhesive) prior to assembly is greatly facilitated.

The invention is especially valuable when said first, vitreous sheet is a thin sheet which is at most 3 mm, for example at most 1.5 mm in thickness because the fragility of a thin sheet especially when untempered, imposes restrictions on the bonding conditions to which it may be subjected. When use is made of a said thin vitreous sheet, it is preferred that said assembly is degassed while lying generally horizontally with such thin uppermost sheet. The weight of such a thin sheet will not be too great so that the adhesive material will be squeezed out from between the sheets, and also the light weight of the sheet allows highly efficient degassing. For certain adhesives, especially solvent-based adhesives, the degassing may be such as to cause the adhesive to foam due to removal of solvent vapour or any other gases within the adhesive body. When pressure is returned to atmospheric pressure, the foamed adhesive collapses on itself to form a body with a remarkably low propensity to bubble during aging. In such circumstances it has been found very desirable to allow the adhesive foam to rise and this is permitted by the comparatively low weight of such a thin vitreous sheet.

The degassing pressure to which the assembly is subjected is preferably below 500 mm Hg. It may for example be below 300 mm Hg. Degassing can proceed very effectively at these pressures. It has in fact been found that the optimum degassing pressure is in part dependent on the size of the sheets and that the larger the sheets are, the lower is the optimum pressure. Accordingly in some embodiments of the invention it is preferred that said assembly is subjected to a degassing pressure below 3 mm Hg.

The adhesive body is preferably at most 150 μm, and optimally at most 80 μm in thickness. These features have the advantage of allowing particularly effective degassing of the layer of adhesive material.

The adhesive material may be applied in various ways, for example by brush or roller or spraying or curtain coating, but it is preferred to apply the adhesive serigraphically since this allows particularly uniform layers to be achieved in a simple and rapid manner.

The adhesive body preferably comprises a coating applied to each said sheet since this promotes efficient bonding.

Assembly of the various plies of the panel is facilitated when said viscosity range for the adhesive is 40 to 70 poises, as is preferred.

Various types of adhesive may be used in accordance with the invention, for example liquid prepolymers and polymer solutions such as solutions of acrylic resins or polyurethane, but the adhesive used in preferably an epoxy resin.

The invention is especially suitable for bonding the first, vitreous sheet to a metal sheet, for example to form a reflector. In such a case, the reflective mirror surface of the laminate may be provided by a face of the metal sheet. Alternatively, the first, vitreous sheet may bear a mirror coating.

BRIEF DESCRIPTION OF THE DRAWINGS

Preferred embodiments of the invention will now be described with reference to the accompanying diagrammatic drawings in which:

FIG. 1 shows an assembly in cross section prior to its lamination;

FIG. 2 illustrates the degassing step, and

FIG. 3 shows a finished panel in cross section.

DESCRIPTION OF THE PREFERRED EMBODIMENTS

FIG. 1 shows in cross section a first, vitreous sheet 1 having an adhesive coating 2 assembled on top of a second sheet 3 also of vitreous material and also bearing an adhesive coating (indicated at 4). The adhesive coatings 2 and 4 together constitute an adhesive body 5 which will serve to bond the finished assembly together as a laminate. The adhesive used to form the coatings 2 and 4 has a viscosity in the range 15 to 300 poises, preferably in the range 40 to 70 poises, and the two layers together have a thickness less than or equal to 250 μm, preferably less than 150 μm.

FIG. 2 illustrates a vacuum chamber 6 which can be evacuated via a pipe 7 having a valve 8. The chamber 6 contains a plurality of panel assemblies 9 each supported horizontally on a rack 10. Each assembly consists of a first, vitreous sheet 11 beneath which an adhesive body 12 is sandwiched by a second sheet 13. The first, uppermost sheets 11 are made of thin glass, i.e. glass 3 mm or less in thickness and preferably less than 1.5 mm in thickness. The adhesive used in the bodies 12 is for instance a solvent based adhesive initially applied as a layer less than 150 μm thick, for example 80 μm or less in thickness. In order to degas the assemblies 9 prior to bonding, they are loaded into the chamber 6 and this is then evacuated via pipe 7 to a suitable sub-atmospheric pressure. Such pressure is preferably below 500 mm Hg and may be below 300 mm Hg. During degassing, the adhesive body 12 may foam, and because of the lightness of the uppermost sheet 11, this foam will be allowed to rise, but it will collapse again before or when atmospheric pressure is restored after degassing by opening the valve 8 in pipe 7. After degassing, the adhesive bodies 12 are caused or allowed to set to bond the assemblies 9 together. The sheets 13 may be of glass or metal.

FIG. 3 illustrates a laminated mirror 14 consisting of a first, thin vitreous sheet 15 bearing a mirror coating 16 which is bonded to a second sheet 17 of metal or glass by an adhesive body 18.

EXAMPLE 1

A solar reflector panel measuring 100×75 cms is made by laminating together a silvered glass sheet 0.8 mm in thickness and a galvanised steel sheet 1.0 mm in thickness. The glass sheet is optionally chemically tempered. 150 grams of epoxy adhesive was applied evenly using a silk screen, half to the silvered face of the glass sheet and half to a face of the steel sheet. If desired, the steel sheet may be pre-coated with a primer. The composition of the adhesive was as follows (parts by weight)

'Epon' 850 (Trade Mark) from Shell Chemical Co.—70 parts
'Versamid' 140 (Trade Mark) from General Mills Co. (Polyamino polyamide)—30 parts
'Hycar' (Trade Mark) B. F. Goodrich (Amino-terminated butadiene acrylonitrile)—10 parts
Viscosity at 25° C.—about 60 poises The total thickness of each adhesive coating was 75 μm.

The adhesive coated sheets were assembled vertically and then laid horizontally in a vacuum chamber with the glass sheet uppermost. Pressure within the chamber was reduced to 2 to 3 mm Hg for 15 to 30 minutes at ambient temperature to degas the assembly and was then allowed to return to atmospheric over a period of 2 to 3 minutes. The degassed assembly was allowed to cure for 12 hours at ambient temperature and was finally post-cured for 1 hour at 70° C. In a variant, the post-curing at elevated temperature is omitted. In this case the adhesive cures at ambient temperature in 24 hours.

EXAMPLE 2

Another reflective panel of approximately the same area was made from a glass mirror 1 mm in thickness and a metal sheet also 1 mm in thickness. Adhesive coatings each 30 μm in thickness were applied to the silvered and paint-protected surface of the mirror and to the optionally primed metal sheet. The adhesive used was based on 'Epikote' (trade mark) epoxy resin from Shell Chemical Company. The actual composition of the adhesive used was as follows (parts by weight)

'Epikote' 828—100
Talc (filler)—80
DTA (also from Shell) (curing agent)—11 together with a sufficient quantity of dimethoxymethane as solvent to give the mixture a viscosity of about 200 poises at 25° C. The adhesive was spread over the sheet faces with a spiral wire.

The sheets were assembled horizontally and subjected to a degassing schedule similar to that of Example 1 at ambient temperature whereafter the adhesive was allowed to cure at ambient temperature.

Methylene chloride or a low boiling aromatic solvent may be substituted for the dimethyoxymethane if desired.

As an alternative curing agent, 'Versamid' 125 (Trade Mark) may be cited.

EXAMPLE 3

A glass mirror 0.8 mm in thickness was laminated to a 5 mm thick glass sheet using an epoxy adhesive available from Ciba-Geigy and having the following composition (parts by weight)

'Araldite' AZ 135 (Trade Mark)—100 parts
HZ 15 (hardener)—30 parts

This grade of 'Araldite' is a solution which has a viscosity of 25-30 poises at 25° C. and the hardener has a viscosity of 3-6 centipoises at the same temperature. The viscosity of the mixture can be adjusted if necessary using acetone as solvent.

Layers 50 μm in thickness were sprayed onto the mirror-coated face of the glass mirror and onto a face of the thicker glass sheet. Before assembly, the adhesive layers were pre-dried to remove solvent. This was done by subjecting the sheets to a temperature of 100° C. for 10 minutes taking care that this did not raise the viscosity of the adhesive above 300 poises.

The sheets were then assembled together and placed horizontally in a vacuum chamber with the mirror sheet uppermost and the pressure in the chamber was then reduced to 2 to 3 mm Hg for 5 to 10 minutes while the temperature in the chamber was maintained at 100° C., to degas the adhesive layer.

After ambient pressure was restored, the degassed assembly was treated at 160° C. for 1½ hours to effect curing of the adhesive.

We claim:

1. A method of bonding a first, vitreous sheet to a second sheet via an intervening body of adhesive material, characterised by the steps of forming an assembly of said two sheets with a said intervening body of adhesive material which is at most 250 μm thick and has a viscosity in the range of 15 to 300 poises, the adhesive being such that it is settable by evaporation of solvent or by hot or cold curing, placing the assembly in a chamber in a manner such that the assembly is directly exposed to the environment of the chamber, degassing the assembly by subjecting it to subatmospheric environmental pressure in the chamber at a temperature such as to maintain the adhesive viscosity within said range, and then exposing the assembly to atmospheric environmental pressure in the chamber and causing or allowing the adhesive to set.

2. A method according to claim 1, wherein said first, vitreous sheet is a thin sheet which is at most 3 mm and preferably at most 1.5 mm in thickness.

3. A method according to claim 2, wherein said assembly is degassed while lying generally horizontally with its said thin vitreous sheet uppermost.

4. A method according to claim 1, wherein said assembly is subjected to a degassing pressure below 500 mm Hg for example below 300 mm Hg.

5. A method according to claim 4, wherein said assembly is subjected to a degassing pressure below 3 mm Hg.

6. A method according to claim 1, wherein said adhesive body is at most 150 μm and preferably at most 80 μm in thickness.

7. A method according to claim 1, wherein said adhesive is applied serigraphically.

8. A method according to claim 1, wherein said adhesive body comprises a coating applied to each said sheet.

9. A method according to claim 1, wherein said viscosity range for the adhesive is 40 to 70 poises.

10. A method according to claim 1, wherein said adhesive is an epoxy adhesive.

11. A method according to claim 1, wherein said second sheet is a metal sheet.

12. A method according to claim 1, wherein said vitreous sheet bears a mirror coating.

13. A method according to claim 1 and substantially as herein described.

14. A method according to claim 1 wherein said assembly is degassed while lying generally horizontally with one said sheet uppermost, and said step of placing is carried out to expose at least the upper surface and all side surfaces of the assembly directly to the environment of the chamber.

15. A method according to claim 14 wherein the uppermost sheet is said first, vitreous sheet and said first, vitreous sheet is a thin sheet at most 3 mm in thickness.

16. A method according to claim 1 wherein said step of exposing follows said step of degassing without any intervening increase in the pressure in the chamber to a value above atmospheric.

17. A method as defined in claim 1 wherein the intervening body of adhesive material is in the form of a continuous layer coextensive with each sheet and contacting each sheet over the entire surface thereof, and the assembly, after bonding, is a laminated panel.

18. A method as defined in claim 1 wherein the chamber is larger than the assembly, with respect to all dimensions of the assembly, and said step of placing comprises introducing the assembly into the chamber so that the assembly is completely enclosed by the chamber.

* * * * *